(12) United States Patent
Spurlin

(10) Patent No.: US 8,429,628 B2
(45) Date of Patent: Apr. 23, 2013

(54) SYSTEM AND METHOD FOR COMPARING PARTIALLY DECOMPILED SOFTWARE

(75) Inventor: William J Spurlin, Belmont, MA (US)

(73) Assignee: International Business Machines Corporation, Armonk, NY (US)

( * ) Notice: Subject to any disclaimer, the term of this patent is extended or adjusted under 35 U.S.C. 154(b) by 1269 days.

(21) Appl. No.: 11/966,243

(22) Filed: Dec. 28, 2007

(65) Prior Publication Data

US 2009/0172650 A1 Jul. 2, 2009

(51) Int. Cl.
*G06F 9/45* (2006.01)

(52) U.S. Cl.
USPC .......................................... 717/144; 717/154

(58) Field of Classification Search .......... 717/106–119, 717/140–160
See application file for complete search history.

(56) References Cited

U.S. PATENT DOCUMENTS 7,426,721 B1 * 9/2008 Saulpaugh et al. ........... 717/144
7,844,958 B2 * 11/2010 Colton et al. ................. 717/146

OTHER PUBLICATIONS

Naeem, "Programmer-Friendly Decompiled JAVA", Aug. 2006, A Thesis, School of Computer Science—McGill University, Montreal, 202 pages.*
N. A. Naeem and L. Hendren, "Programmer-friendly Decompiled Java", Mar. 2006, Sable technical report No. 2006-2, McGill University, Canada, 20 pages.*
Schulman, "Finding Binary Clones with Opstrings & Function Digests: Part 1," http://www.drdobbs.com/architecture-and-design/184406152, downloaded on May 21, 2012, pp. 1-19.
Demeyer et al., "Object-Oriented Reengineering Patterns," Jun. 1, 2008, pp. 1- 341.
Van Emmerik, "Signatures for Library Functions in Executable Files," Information Security Research Center, Queensland University of Technology, 1994, pp. 1-8.
Ducasse et al., "A Language Independent Approach for Detecting Duplicated Code," Software Composition Group, University of Berne, downloaded on Jul. 27, 2012, pp. 1-10.
Baxter et al., "Clone Detection Using Abstract Syntax Trees," IEEE 1998, Published in the Proceedings of ICSM '98, Nov. 16-19, 1998 in Bethesda, MD, pp. 1-10.

* cited by examiner

*Primary Examiner* — Ted T Vo
(74) *Attorney, Agent, or Firm* — Holland & Knight LLP; Brian J. Colandreo, Esq.; Jeffrey T. Placker, Esq.

(57) ABSTRACT

A method and computer program product for generating a suspect abstract syntax tree by partially decompiling a compiled software module. The suspect abstract syntax tree is compared to one or more reference abstract syntax trees.

18 Claims, 2 Drawing Sheets

SYSTEM AND METHOD FOR COMPARING PARTIALLY DECOMPILED SOFTWARE

TECHNICAL FIELD

This disclosure relates to software comparison processes and, more particularly, to software comparison processes that compare abstract syntax trees.

BACKGROUND

Software, in its compiled form, is intended to be executed on a computing device, such as a personal computer. Software is comprised of machine language or byte code (i.e., code that a computer can read and execute). Generally, machine language and byte code are comprised of binary instructions i.e., ones and zeros.

Generally speaking, it is impractical/impossible for a person to view, read, or manipulate machine language or byte code. On the other hand, high level (i.e., text-based) programming languages (e.g., C, C++ & FORTRAN) were created to simplify programming by making it faster and easier. These high level languages are composed of human-readable language elements, thus allowing for simplified understanding by computer programmers. For example, while a conditional "if" statement may be represented by many ones and zeros in compiled code, it may be represented by the word "IF" in high level language code. Accordingly, a computer programmer may easily be able to read, modify, and understand the source code of a high level language.

A situation may arise in which one may wish to compare the computer program included within a first piece of compiled machine code to the computer program included within a high-level language code. For example, one may desire to see how closely the computer program included within the compiled code resembles the computer program included within the source code. Alternatively, one may want to determine whether a particular compiled code module was generated from a particular source code listing. Because compiled code and source code take very different forms, a direct comparison may not be possible. First and as mentioned above, the compiled code may be very difficult to read and understand. Second, the source code may contain superfluous elements such as comments and extra parentheses that will make the code easier to read, but will not affect the underlying semantics and/or the algorithm of the code. Compiled code will be devoid of these superfluous elements. Accordingly, such elements may interfere with a direct comparison.

SUMMARY OF DISCLOSURE

In a first implementation, a method includes generating a suspect abstract syntax tree by partially decompiling a compiled software module. The suspect abstract syntax tree is compared to one or more reference abstract syntax trees.

One or more of the following features may be included. Comparing the suspect abstract syntax tree to the one or more reference abstract syntax trees may include generating one or more similarity measurements with respect to the suspect abstract syntax tree and the one or more reference abstract syntax trees. The one or more reference abstract syntax trees may be representative of one or more source code listings. A determination may be made concerning whether the compiled software module was compiled from the one or more source code listings. Determining whether the compiled software module was compiled from the one or more source code listings may include processing the one or more similarity measurements.

The one or more reference abstract syntax trees may be generated by partially compiling the one or more source code listings. The one or more source code listings may be stored within a database. The one or more reference abstract syntax trees may be stored within a database. The compiled software module may be stored within a database. The suspect abstract syntax tree may be stored within a database.

In another implementation, a computer program product resides on a computer readable medium that has a plurality of instructions stored on it. When executed by a processor, the instructions cause the processor to perform operations including generating a suspect abstract syntax tree by partially decompiling a compiled software module. The suspect abstract syntax tree is compared to one or more reference abstract syntax trees.

One or more of the following features may be included. Comparing the suspect abstract syntax tree to the one or more reference abstract syntax trees may include generating one or more similarity measurements with respect to the suspect abstract syntax tree and the one or more reference abstract syntax trees. The one or more reference abstract syntax trees may be representative of one or more source code listings. A determination may be made concerning whether the compiled software module was compiled from the one or more source code listings. Determining whether the compiled software module was compiled from the one or more source code listings may include processing the one or more similarity measurements.

The one or more reference abstract syntax trees may be generated by partially compiling the one or more source code listings. The one or more source code listings may be stored within a database. The one or more reference abstract syntax trees may be stored within a database. The compiled software module may be stored within a database. The suspect abstract syntax tree may be stored within a database.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings denote like elements.

DETAILED DESCRIPTION OF THE PREFERRED EMBODIMENTS

Figure 1:
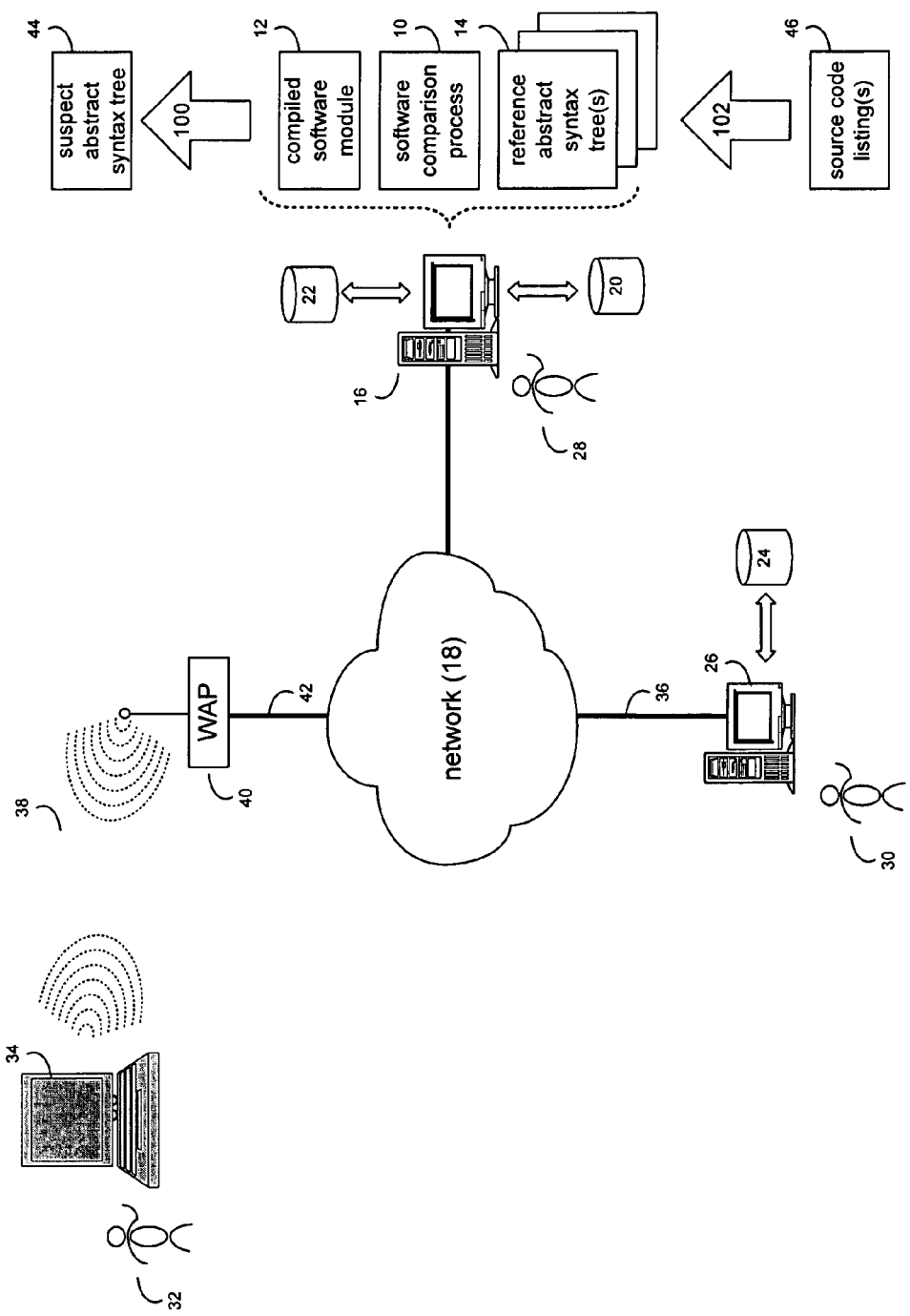
FIG. 1 is a diagrammatic view of a software comparison process coupled to a distributed computing network.

System Overview:

Referring to FIG. 1, there is shown software comparison process 10. As will be discussed below in greater detail, the software comparison process 10 may generate a suspect abstract syntax tree by partially decompiling a compiled software module (e.g., compiled software module 12). Software comparison process 10 may compare the suspect abstract syntax tree to one or more reference abstract syntax trees (e.g., reference abstract syntax trees 14). Software comparison process 10 may be a stand alone application or may be an applet/application executed within a third-party software comparison application (not shown).

Software comparison process 10 may reside on and may be executed by computer 16, which may be connected to network 18. Network 18 may be any kind of distributed computing network including, but not limited to, a local area network ("LAN"), a wide area network ("WAN"), or a wireless network. Network 18 may also be a combination of interconnected networks. For example, network 18 may include multiple, interconnected networks, which may include but are not limited to LANs, WANs, wireless networks, or any other type of network. Network 18 may also be connected to one or more secondary networks (not shown), examples of which may include but are not limited to: a local area network, a wide area network, an intranet, or the internet.

Examples of computer 16 may include, but are not limited to: a server computer, a series of server computers, a mini computer, and a mainframe computer. Computer 16 may be a web server (or a series of servers) running a network operating system, examples of which may include but are not limited to: Microsoft Windows 2003 Server™; Novell Netware™; or Redhat Linux™, for example. Alternatively, computer 16 may also be a personal computer running a personal operating system such as Microsoft Vista Ultimate™, Ubuntu Linux™, or Mac OS X™. Computer 16 may execute a web server application, examples of which may include but are not limited to: Microsoft IIS™, Novell Webserver™, or Apache Webserver™, that allows for HTTP (i.e., HyperText Transfer Protocol) access to computer 16 via network 18.

The instruction sets and subroutines of software comparison process 10, which may be stored on storage device 20 coupled to computer 16, may be executed by one or more processors (not shown) and one or more memory architectures (not shown) incorporated into computer 16. Examples of storage device 20 may include but are not limited to a hard disk drive; a tape drive; an optical drive; a RAID array; a random access memory (RAM); and a read-only memory (ROM).

Software comparison process 10 may access data within one or more databases. For example, software comparison process 10 may access "local" database 22 (which is served locally on computer 16) or "remote" database 24 (which is served remotely on computer 26 and accessible via network 18).

In order to facilitate access to the data stored within databases 22, 24, one or more of computer 16 and server computer 26 may execute database software such as Microsoft SQL Server™, mySQL™, Oracle Database 11g™, or any other form of database software. Alternatively, the database may be a custom database, such as a flat file database or an XML database.

User 28 may access software comparison process 10 directly through the device on which software comparison process 10 is executed (e.g., computer 16). Further, remote users (e.g., users 30, 32) may access software comparison process 10 using computer 26 and laptop computer 34 (respectively) via network 18 and/or through the above-referenced secondary network (not shown). The various remote devices may be coupled to network 18 in various ways. For example, computer 26 may be coupled to network 18 (and software comparison process 10) via hardwired network connection 36. Alternatively, laptop computer 34 may be coupled to network 18 (and software comparison process 10) via wireless communication channel 38 established between laptop computer 34 and wireless access point (i.e., WAP) 40. WAP 40 may be coupled to network 18 via hardwired network connection 42.

WAP 40 may be, for example, an IEEE 802.11a, 802.11b, 802.11g, Wi-Fi, and/or Bluetooth device that is capable of establishing wireless communication channel 38 between laptop computer 34 and WAP 40. As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Software Comparison Process:

While software comparison process 10 may be accessed locally or remotely, for illustrative purposes, the following discussion will be limited to accessing software comparison process 10 locally (e.g., accessing software comparison process 10 through computer 16). However, it is understood that other configurations are possible and are considered to be within the scope of this disclosure.

Figure 2:
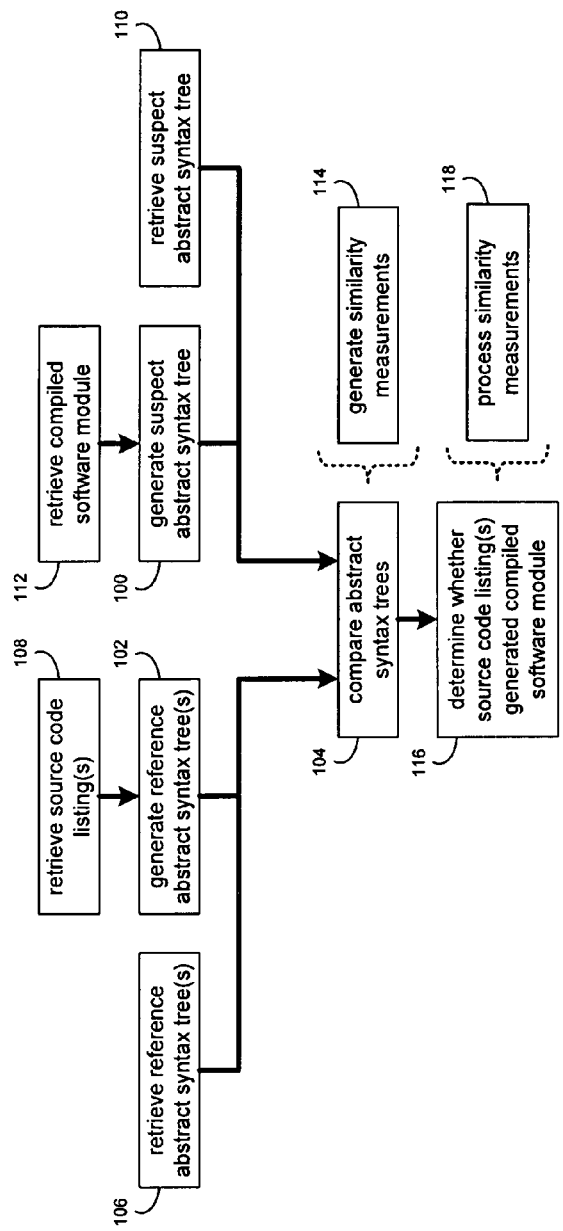
FIG. 2 is a flowchart of the software comparison process of FIG. 1.

Referring also to FIG. 2, assume for illustrative purposes that user 28 of software comparison process 10 suspects that compiled software module 12 may have been compiled (without permission) from source code available to/owned by user 28. Software comparison process 10 may partially decompile compiled software module 12 to generate 100 suspect abstract syntax tree 44.

As is known in the art, an abstract syntax tree (e.g., reference abstract syntax tree(s) 14 and suspect abstract syntax tree 44) may be a data object that unambiguously represents a computer program included within a piece of compiled code. For example, suspect abstract syntax tree 44 (which software comparison process 10 may generate 100 by partially decompiling compiled software module 12) may unambiguously represent the computer program included within compiled software module 12. Further, reference abstract syntax tree(s) 14 may unambiguously represent the computer program included within source code listing(s). For example, reference abstract syntax tree(s) 14 (which software comparison process 10 may generate 102 by partially compiling source code listing(s) 46) may unambiguously represent the computer program included within source code listing(s) 46.

As is known in the art, an abstract syntax tree (e.g., reference abstract syntax tree(s) 14 and suspect abstract syntax tree 44) may be used within a compiler as an intermediate form of a computer program. Accordingly, source code may be partially compiled to generate an abstract syntax tree. Conversely, a compiled software module may be partially decompiled to generate an abstract syntax tree.

As is known in the art, an abstract syntax tree for a particular computer program (as defined within e.g., a compiled software module or a source code listing) may represent data as internal nodes that have connections or links to more than one other node, or as leaf nodes that have connections or links to exactly one other node. The instructions and data objects in compiled software code, such as compiled software module 12, may generally be comprised of two types of elements: operators that perform a function (e.g., adding, subtracting, jumping, or breaking); and operands that represent data or objects (e.g., integers, floating point numbers or other data structures). An abstract syntax tree may store operators as internal nodes and operands as leaf nodes. Therefore, by including all the instructions and data, an abstract syntax tree may exactly represent the computer program (e.g., the source code listing/compiled software module) from which the abstract syntax tree was generated.

When generating an abstract syntax tree (e.g., reference abstract syntax tree(s) 14) from source code (e.g., source code listing(s) 46), software comparison process 10 may strip the source code of any superfluous elements (e.g., comments/spaces/parentheses) that do not substantively impact the software. As is known in the art, even parentheses and other elements (included within source code) that are necessary for the software to function properly may be omitted and replaced by the underlying abstract syntax tree structure. Since abstract syntax tree manipulation (and algorithms that compare abstract syntax trees) is well known in the art and commonly used/available, generation of an abstract syntax tree may also make the software that it represents easier to manipulate and analyze. Further, since abstract syntax trees precisely and unambiguously represent the computer program included within the source code and/or compiled software module, comparing/manipulating/measuring a plurality of abstract syntax trees may effectuate the comparison of e.g., a compiled software module and source code listing(s).

When software comparison process 10 partially decompiles compiled software module 12, software comparison process 10 may store the data objects and instructions (i.e. the operands and operators) included within compiled software module 12 to generate 100 suspect abstract syntax tree 44. Suspect abstract syntax tree 44 may then precisely represent the compiled software code contained within compiled software module 12. Since suspect abstract syntax tree 44 is a representation of the computer program embedded within compiled software module 12, any comparison performed on suspect abstract syntax tree 44 may produce essentially the same results that one would expect if a comparison were performed on compiled software module 12 itself.

As is known in the art, software code (in compiled form) may be difficult to manipulate. One advantage of partially decompiling compiled software module 12 to generate 100 suspect abstract syntax tree 44 is that suspect abstract syntax tree 44 is easier to parse and manipulate (when compared to compiled software module 12), and may facilitate the comparison between compiled software module 12 and various source code listing(s). Specifically, an abstract syntax tree may capture the semantics and algorithm(s) of the compiled code in a more manageable form that allows for the use of e.g., tree manipulation and comparison algorithms that are well known in the art. Accordingly, by partially decompiling compiled software module 12 to generate 100 suspect abstract syntax tree 44, comparisons between compiled software module 12 and various pieces of source code may be more easily effectuated.

For example and as discussed above, if one wants to compare compiled software modules/programs, it may prove to be very difficult to perform such a comparison on the compiled code. However, comparing abstract syntax trees that precisely represent the compiled software modules/programs may prove to be easier, as abstract syntax trees are simpler to manipulate and may be compared using known tree comparison algorithms. Accordingly, software comparison process 10 may compare 104 suspect abstract syntax tree 44 to one or more reference abstract syntax trees 14 to determine the similarities between compiled software module 12 (as represented by suspect abstract syntax tree 44) and source code listing 46 (as represented by reference abstract syntax tree(s) 14.

Partially compiling source code listing(s) 46 to generate 102 reference abstract syntax tree(s) 14 may also allow source code listing(s) 46 to be more easily manipulated. For example and as discussed above, reference abstract syntax tree(s) 14 may omit elements of source code listing(s) 46 that do not affect the underlying semantics. For example and as discussed above, reference abstract syntax tree(s) 14 may likely omit syntactic elements (e.g., grouping parentheses, brackets, comments, and other elements) that do not affect the underlying semantics/algorithms of source code listing(s) 46, as these elements (and the functions that they perform) may be inherent within reference abstract syntax tree(s) 14. Specifically, the ability to manipulate and compare software may be made easier by stripping the software to its semantic core, storing it as an abstract syntax tree, and employing algorithms that work on abstract syntax trees. Because abstract syntax trees precisely and unambiguously represent the code semantics, comparing 104 abstract syntax trees is essentially the same as comparing the actual source code listing(s) represented by those abstract syntax trees.

If reference abstract syntax tree(s) 14 had been previously generated 102, software comparison process 10 may simply retrieve 106 reference abstract syntax tree(s) 14 from a database (e.g., databases 22, 24) or a computer readable medium (e.g., storage device 20) accessible by software comparison process 10. Alternatively, software comparison process 10 may retrieve 108 source code listing(s) 46 from a database (e.g., databases 22, 24) or from a computer readable medium (e.g., storage device 20) accessible by software comparison process 10 so that reference abstract syntax tree(s) 14 may be generated 102 by partially compiling source code listing(s) 46.

The process of partially compiling source code listing(s) 46 may not produce executable code; as it may only produce reference abstract syntax tree 14 that represents source code listing(s) 46 (which cannot be executed directly on a computer).

If suspect abstract syntax tree 44 had been previously generated 100, software comparison process 10 may simply retrieve 110 suspect abstract syntax tree 44 from a database (e.g., databases 22, 24) or a computer readable medium (e.g., storage device 20) accessible by software comparison process 10. Alternatively, software comparison process 10 may retrieve 112 compiled software module 12 from a database (e.g., databases 22, 24) or from a computer readable medium (e.g., storage device 20) accessible by software comparison process 10 so that suspect abstract syntax tree 44 may be generated 100 by partially decompiling compiled software module 12.

Once software comparison process 10 has generated 100 (or retrieved 110) suspect abstract syntax tree 44 and generated 102 (or retrieved 106) reference abstract syntax tree(s) 14, software comparison process 10 may compare 104 suspect abstract syntax tree 44 and reference abstract syntax tree(s) 14 to generate 114 one or more similarity measurements that define and quantify the similarities and differences between abstract syntax trees 14, 44. Software comparison process 10 may repeatedly compare 104 abstract syntax trees 14, 44 and generate 114 the similarity measurements. For example, if there are ten reference abstract syntax trees, software comparison process 10 may compare 104 suspect abstract syntax tree 44 to each of the ten reference abstract syntax trees, and may generate ten separate similarity measurements.

As discussed above, an abstract syntax tree object may include nodes and connections between nodes. Internal nodes may be linked to one or more other nodes while end nodes (or leaf nodes) may be connected to exactly one other node. There may also be a root node, which may be the top-most node in the tree. As is known in the art, tree comparison algorithms may measure the resemblance between trees by comparing the nodes, the contents of the nodes, and the connections between nodes. Some tree comparison algorithms may produce a "distance" measurement that represents how different the trees are (e.g., dissimilar trees are "distant" from each other). The similarity may be expressed as an inverse function of the distance between the trees. For example, if the distance measurement between a pair of abstract syntax trees is small, the abstract syntax trees may be similar. But if the distance measurement between the abstract syntax trees is large, the abstract syntax trees may be dissimilar. One way that software comparison process 10 may compare two abstract syntax trees is through the use of a tree distance algorithm including, but not limited to, a degree-one edit distance algorithm, a degree-two edit distance algorithm, or a constrained edit distance algorithm. Software comparison process 10 may use other tree comparison algorithms to measure the similarity between the abstract syntax trees, such as a weighted tree similarity algorithm. Any appropriate algorithm (or group of algorithms) may be employed by software comparison process 10 to compare 104 reference abstract syntax tree 14 and suspect abstract syntax tree(s) 44 and generate 114 the above-described similarity measurements.

Generating 114 the above-described similarity measurements may produce a single similarity measurement or a plurality of similarity measurements that may be used to gauge the similarity between the abstract syntax trees. For example, software comparison process 10 may use a tree distance algorithm that produces e.g., three similarity measurements representative of different aspects of similarity between reference abstract syntax tree 14 and suspect abstract syntax tree(s) 44. The first similarity measurement may e.g., gauge the similarity between the end nodes of reference abstract syntax tree 14 and suspect abstract syntax tree(s) 44. The second similarity measurement may e.g., gauge the similarity between the internal nodes of reference abstract syntax tree 14 and suspect abstract syntax tree(s) 44. And the third similarity measurement may e.g., gauge the similarity between the node connections of reference abstract syntax tree 14 and suspect abstract syntax tree(s) 44. Further, other similarity measurements may gauge the similarities between various other aspects of reference abstract syntax tree 14 and suspect abstract syntax tree(s) 44. Alternatively, software comparison process 10 may use a tree distance algorithm that produces e.g., a single similarity measurement representative of different aspects of similarity between reference abstract syntax tree 14 and suspect abstract syntax tree(s) 44.

The above-described similarity measurements(s) may represent how closely the abstract syntax tree 14 and suspect abstract syntax tree(s) 44 resemble each other. For example and as discussed above, the above-described similarity measurements may indicate that abstract syntax tree 14 and suspect abstract syntax tree(s) 44 are exactly the same, that abstract syntax tree 14 and suspect abstract syntax tree(s) 44 are completely dissimilar, or that abstract syntax tree 14 and suspect abstract syntax tree(s) 44 have some intermediate level of similarity. For example, through the use of the above-described similarity measurements, software comparison process 10 may determine whether source code listing(s) 46 were used to generate compiled software module 12 by processing 118 the above-described similarity measurements.

Accordingly and as discussed above, the above-described similarity measurements may indicate definitively that compiled software module 12 was generated from source code listing(s) 46; may indicate a high probability that compiled software module 12 was generated from source code listing(s) 46; may indicate a low probability that compiled software module 12 was generated from source code listing(s) 46; or may indicate definitively that compiled software module 12 was not generated from source code listing(s) 46. When making such a determination 116, software comparison process 10 may compare the above-described similarity measurements to one or more defined similarity thresholds. For example, a defined similarity threshold may be set such that, if the above-described similarity measurement is greater than the defined similarity threshold, it is likely that compiled software module 12 was generated from source code listing(s) 46. Conversely, if the above-described similarity measure is less than the defined similarity threshold, it is likely that compiled software module 12 was generated from source code listing(s) 46.

One embodiment of software comparison process 10 may be useful in determining which version of a source code listing generated a compiled software module. It is common to retain different versions of a source code listing during software development. Previous versions of a source code listing are often used as a reference or as an aid in debugging. If there is a question as to what version of a source code listing generated the compiled software module, software comparison process 10 may compare the compiled software module to different versions of source code listing(s). This may be useful in determining, for example, which version of the source code listing introduced a bug into the compiled software module.

Another embodiment of software comparison process 10 may be helpful in determining whether a compiled software module was compiled from a copy-protected source code listing. If the reference abstract syntax tree (or trees) are generated from a source code listing that is known to be protected by intellectual property protection, comparing 104 and processing 118 the above-described similarity measurement the abstract syntax trees may be helpful in determining whether the compiled software module was compiled from a source code listing protected by intellectual property protection. This may be useful in determining, for example, whether the source code listing that generated the compiled software module is under copyright protection.

A number of implementations have been described. Nevertheless, it will be understood that various modifications may be made. Accordingly, other implementations are within the scope of the following claims.

What is claimed is:

1. A method comprising:
    generating, by one or more computing devices, a suspect abstract syntax tree by partially decompiling a compiled software module;
    comparing, by the one or more computing devices, the suspect abstract syntax tree to one or more reference abstract syntax trees, wherein the one or more reference abstract syntax trees are generated from partially compiled source code;
    generating, by the one or more computing devices, one or more similarity measurements from the comparison of the suspect abstract syntax tree and the one or more reference abstract syntax trees, wherein the one or more similarity measurements quantify the similarities and differences between the suspect abstract syntax tree and the one or more reference abstract syntax trees; and
    determining, by the one or more computing devices, the suspect abstract syntax tree was generated from the same source code as the one or more reference abstract syntax trees, based upon, at least in part, the one or more similarity measurements.

2. The method of claim 1, wherein the one or more reference abstract syntax trees are retrieved from a database.

3. The method of claim 2 wherein the one or more reference abstract syntax trees are representative of one or more source code listings, the method further comprising:
determining whether the compiled software module was compiled from the one or more source code listings.

4. The method of claim 3 wherein determining whether the compiled software module was compiled from the one or more source code listings includes:
processing the one or more similarity measurements.

5. The method of claim 3 further comprising:
generating the one or more reference abstract syntax trees by partially compiling the one or more source code listings.

6. The method of claim 5 wherein the one or more source code listings are stored within a database.

7. The method of claim 1 wherein the one or more reference abstract syntax trees are stored within a database.

8. The method of claim 1 wherein the compiled software module is stored within a database.

9. The method of claim 1 wherein the suspect abstract syntax tree is stored within a database.

10. A computer program product residing on a computer readable medium having a plurality of instructions stored thereon which, when executed by a processor, cause the processor to perform operations comprising:
generating, by the one or more computing devices, a suspect abstract syntax tree by partially decompiling a compiled software module;
comparing, by the one or more computing devices, the suspect abstract syntax tree to one or more reference abstract syntax trees, wherein the one or more reference abstract syntax trees are generated from partially compiled source code;
generating, by the one or more computing devices, one or more similarity measurements from the comparison of the suspect abstract syntax tree and the one or more reference abstract syntax trees, wherein the one or more similarity measurements quantify the similarities and differences between the suspect abstract syntax tree and the one or more reference abstract syntax trees; and
determining, by the one or more computing devices, the suspect abstract syntax tree was generated from the same source code as the one or more reference abstract syntax trees, based upon, at least in part, the one or more similarity measurements.

11. The computer program product of claim 10, wherein the one or more reference abstract syntax trees are retrieved from a database.

12. The computer program product of claim 11 wherein the one or more reference abstract syntax trees are representative of one or more source code listings, the computer program product further comprising instructions for:
determining whether the compiled software module was compiled from the one or more source code listings.

13. The computer program product of claim 12 wherein the instructions for determining whether the compiled software module was compiled from the one or more source code listings include instructions for:
processing the one or more similarity measurements.

14. The computer program product of claim 12 further comprising instructions for:
generating the one or more reference abstract syntax trees by partially compiling the one or more source code listings.

15. The computer program product of claim 14 wherein the one or more source code listings are stored within a database.

16. The computer program product of claim 10 wherein the one or more reference abstract syntax trees are stored within a database.

17. The computer program product of claim 10 wherein the compiled software module is stored within a database.

18. The computer program product of claim 10 wherein the suspect abstract syntax tree is stored within a database.

* * * * *